Aug. 30, 1938.   F. A. HAMILTON, JR., ET AL   2,128,816
AUTOMATIC RECLOSING CIRCUIT BREAKER SYSTEM
Filed March 10, 1937
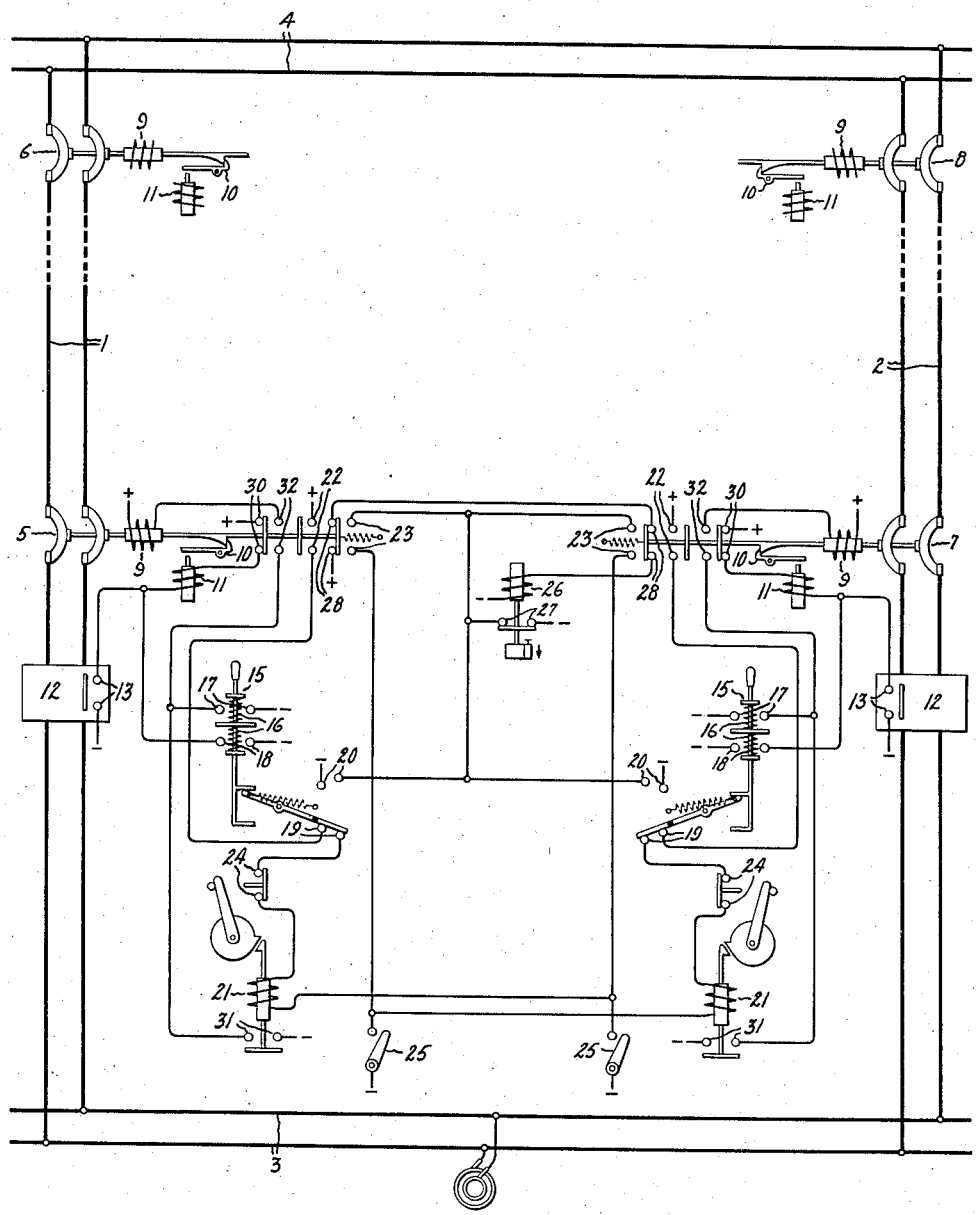
Inventors:
Francis A. Hamilton, Jr
Elbert H Bancker,
by Harry E. Dunham
Their Attorney.

Patented Aug. 30, 1938

2,128,816

UNITED STATES PATENT OFFICE

2,128,816

AUTOMATIC RECLOSING CIRCUIT BREAKER SYSTEM

Francis A. Hamilton, Jr., and Elbert H. Bancker, Schenectady, N. Y., assignors to General Electric Company, a corporation of New York Application March 10, 1937, Serial No. 130,009

10 Claims. (Cl. 175—294)

Our invention relates to automatic reclosing circuit breaker systems and particularly to such systems for automatically reclosing the circuit breakers in a plurality of parallel transmission lines so as to maintain the various parts of the whole electric power system in synchronism as long as possible when a fault occurs on one or more of the parallel lines, and one object of our invention is to provide an improved arrangement for controlling the automatic reclosing of the circuit breakers in the parallel transmission lines of an electric power system.

In order to maintain synchronism between the various parts of an electric power system when a fault occurs on one or more of a plurality of transmission lines of the system, it is always desirable to isolate as quickly as possible the faulty line or lines. In some cases, it is also desirable to reclose quickly the circuit breakers in the faulty line or lines and in other cases, it is desirable not to do so. In accordance with our present invention, we provide an arrangement for controlling the circuit breakers in the parallel lines so that any circuit breaker which has been opened by a fault is automatically reclosed quickly under those circumstances when it should be reclosed in order to maintain the various parts of the system in synchronism, or to regain synchronism, and is not reclosed under those circumstances when its reclosure is not needed to maintain synchronism, or when its reclosure may endanger the maintenance of synchronism, or otherwise be hazardous. For example, we do not effect a quick reclosure of a circuit breaker in a faulty line if the prompt isolation thereof will of itself prevent instability because of the presence of one or more other parallel lines which are not opened by the fault and which can carry the total load without the system losing synchronism. On the other hand, if a system of parallel lines is operated temporarily with only one line in service, which is often the case, the isolation of the line, when a fault occurs thereon, will result in a loss of synchronism so that it is desirable to attempt to regain synchronism by quickly reclosing the circuit breakers in the faulty feeder, and we provide an arrangement for accomplishing this result under these conditions of operation.

Also if the circuit breakers in all of the parallel lines in service are opened by faults simultaneously occurring on each of the lines, it is desirable to reclose all of the circuit breakers as quickly as possible in order to regain synchronism, and we provide an arrangement for accomplishing this result under these conditions of operation. However, if the circuit breakers in one of the parallel lines in service are opened by a fault when the load conditions are such as to result in the subsequent tripping of the circuit breakers in the other parallel lines because of instability, we provide an arrangement for preventing the automatic reclosing of the circuit breakers in any of the parallel lines under these operating conditions as there is nothing to be gained by reconnecting the various parts of the system which are already out of synchronism.

Our invention will be better understood from the following description when taken in connection with the accompanying drawing, the single figure of which illustrates an automatic reclosing circuit breaker arrangement embodying our invention, and its scope will be pointed out in the appended claims.

In the accompanying drawing, 1 and 2 represent two parallel transmission lines interconnecting the buses 3 and 4 of an electric power system. In order to simplify the disclosure, we have shown single phase circuits, but in practice these circuits are usually polyphase circuits. Also, it will be understood that our invention is not limited to two parallel transmission lines, but is applicable to any number of parallel lines, or in other words to any number of circuits terminating at the same two stations.

The transmission line 1 is connected to the bus 3 by a suitable circuit breaker 5 and to the bus 4 by a suitable circuit breaker 6. Similarly, the transmission line 2 is respectively connected to the buses 3 and 4 by suitable circuit breakers 7 and 8. Preferably, each of these circuit breakers is designed in any suitable manner, examples of which are well-known in the art, so that its opening and closing times are very short. Also, each circuit breaker is arranged so that it will be automatically opened when a fault occurs on its associated transmission line and can be rapidly reclosed thereafter under certain conditions. In the drawing, each circuit breaker is shown as a latched-in circuit breaker which is closed by a closing coil 9 when it is energized and which is held in its closed position by a latch 10 that is released by a trip coil 11 when it is energized. Any suitable relay protective means, examples of which are well-known in the art, may be provided for effecting the energization of the trip coil 11 of a circuit breaker when a fault occurs on the associated line. Since the details of such fault-responsive means form no part of our present invention, we have represented such means in connection with the circuit breakers 5 and 7 by a rectangle 12 containing contacts 13 which are closed to complete an energizing circuit for the associated trip coil 11 when a fault occurs on the associated line.

Each of the circuit breakers 6 and 8 which respectively connect the lines 1 and 2 to the bus 4 may be provided with similar relay protective means, not shown, which effect the opening thereof in response to a fault on the associated line. Since the means for controlling the circuit breakers may be the same at each of the two ends of the parallel lines, we have shown in detail only the control means associated with the circuit breakers 5 and 7 which respectively connect corresponding ends of the lines 1 and 2 to the bus 3.

For manually controlling the opening and closing of each of the circuit breakers, there is associated therewith a three-position manually operable control switch 15 which is normally maintained in its neutral position, in which it is shown, by suitable springs 16 and which, when operated in one direction from its neutral position, closes contacts 17 to complete an energizing circuit for the closing coil 9 of the associated circuit breaker if it is open and which, when operated in the opposite direction from its neutral position, closes contacts 18 to complete an energizing circuit for the trip coil 11 of the associated circuit breaker if it is closed. Each control switch 15 also has a set of contacts 19, which are closed when the switch 15 is operated to close its contacts 17 to effect the closing of the associated circuit breaker and which remain closed until the switch 15 is subsequently operated to close its contacts 18 to effect the opening of the associated circuit breaker, and another set of contacts 20 which are closed when the switch is operated to close its contacts 18 and which remain closed until the switch 15 is subsequently operated to close its contacts 17.

In accordance with our invention, as applied to two parallel lines, the opening of the circuit breaker at one end of a line places in operation the normally inoperative automatic reclosing means for the other circuit breaker at the corresponding end of the other line so that if this other circuit breaker is also automatically opened within a predetermined time both circuit breakers will be automatically reclosed, but if the circuit breaker in only one line is opened automatically, it will remain open, and if both circuit breakers open automatically with an interval between their openings which exceeds the predetermined time both will remain open. In the arrangement shown in the drawing, this result is obtained by providing each circuit breaker with suitable automatic reclosing means such as a reclosing relay 21 the starting or energizing circuit of which includes contacts 22 that are closed when the associated circuit breaker is open and contacts 23 that are closed when the circuit breaker at the corresponding end of the other line is also open. Therefore, normally both of the circuit breakers 5 and 7 have to be opened in order to effect the automatic reclosing of either of these breakers. Each relay 21, when energized, is arranged to complete an energizing circuit for the closing coil 9 of the associated circuit breaker and after being energized a predetermined number of times is arranged to open the lock-out contacts 24 in the energizing circuit of its own operating winding. As shown, the lock-out contacts 24 are arranged to be opened in response to the first de-energization of the associated operating winding so that a reclosing relay can effect only one automatic reclosure of the associated circuit breaker. Any suitable manually controlled reset means may be provided for restoring the lock-nut contacts 24 to their normally closed position.

The energizing circuit of each reclosing relay 21 also includes the contacts 19 of the associated control switch 15 so that if the operator intentionally takes a line out of service by operating the associated control switch 15 to its tripping position, the automatic reclosing means therefor is rendered inoperative until the line is put back into service again by operating the associated control switch 15 to its closing position. However, the automatic reclosing means associated with the other line, if it is still in service is rendered operative by the operation of said control switch 15 to its tripping position so that the automatic reclosing of this other circuit breaker is immediately effected in case it is subsequently opened automatically. In order that the automatic reclosing means of a circuit breaker may be rendered operative independently of the position of the other circuit breaker and of the position of the control switch 15 associated with the other circuit breaker, each circuit breaker is provided with a cut-in switch 25 which, when closed, controls the automatic reclosing means of the other circuit breaker so as to render it operative.

When a fault occurs on one of the lines and the faulty line is isolated from the system so that the total load is carried by the remaining line, and this total load is of such a value as to produce instability and cause the circuit breakers in the remaining line to open, it is desirable not to reclose any of the circuit breakers under these conditions in response to the opening of the circuit breakers which are opened due to instability. In order to accomplish this result in the embodiment of our invention shown in the drawing, we provide an arrangement whereby all of the circuit breakers, such as 5 and 7, at corresponding ends of the parallel lines can be automatically reclosed after they have been automatically opened in response to a fault on the associated lines only when all the circuit breakers are opened within a predetermined time interval. Suitable timing means such as a time drop-out relay 26 is set into operation in response to the opening of either the circuit breaker 5 or 7 when both of them are in service and after this timing means has been in operation for a predetermined time, it opens the contacts 27 which are normally closed in the energizing circuits of all of the reclosing relays 21. The energizing circuit of the time relay 26 includes the series connected contacts 28 of both of the circuit breakers 5 and 7 so that the opening of either of these circuit breakers effects the de-energization of the relay 26. Therefore, if faults occur simultaneously on both of the lines 1 and 2 so that both of the circuit breakers 5 and 7 open within a predetermined time interval, determined by the operating time of the time drop-out relay 26, both of the circuit breakers 5 and 7 are automatically reclosed, but if one of these circuit breakers does not open until after the other has been opened for a relatively long time, thereby indicating that the opening of the last circuit breaker is probably due to instability, neither of the circuit breakers is automatically reclosed.

In order to render the automatic reclosing means associated with the other circuit breaker operative when either of the circuit breakers 5 and 7 is taken out of service by the operator, the contacts 20 of each control switch 15 are connected in parallel with the contacts 27.

The operation of the control arrangement disclosed in the drawing is as follows: When both of the circuit breakers 5 and 7 are closed so that the two lines 1 and 2 are in service an energizing circuit is completed for the operating winding of relay 26 through the series-connected contacts 28 on each of the circuit breakers 5 and 6. When a fault occurs on a line, the fault responsive means 12 in the faulty line effects the closing of its associated contacts 13 so that an energizing circuit is completed for the trip coil 11 of the circuit breaker in the faulty line to effect the disconnection thereof from the bus 3. For example, if a fault occurs on line 1 the fault responsive relay 12 in line 1 completes an energizing circuit for the trip coil 11 of the circuit breaker 5 through contacts 30 on the circuit breaker 5. By opening its contacts 28, the circuit breaker 5 starts the timing operation of the relay 26 and by closing its contacts 23, the circuit breaker 5 renders operative the closing relay 21 associated with the other circuit breaker 7. Therefore, if a fault occurs on the line 2 so that the fault responsive means 12 in line 2 effects the opening of the circuit breaker 7 before the time relay 26 completes its timing operation, a circuit is completed for the reclosing relays 21 respectively associated with the circuit breakers 5 and 7. The circuit of each relay 21 includes the contacts 22 of the associated circuit breaker, contacts 19 of the associated control switch 15, the associated lock-out contacts 24, the contacts 23 of the other circuit breaker and the contacts 27 of the relay 26. By closing its contacts 31, each reclosing relay 21 completes through the contacts 32 of the associated circuit breaker an energizing circuit for the closing coil 9 of the associated circuit breaker so as to effect the immediate reclosing thereof. Therefore, if faults occur simultaneously on both of the lines 1 and 2 while they are being operated in parallel, both of the circuit breakers 5 and 7 open and then are immediately reclosed once in order to try to establish as quickly as possible a sound circuit between the two buses 3 and 4 and thereby prevent a loss of synchronism.

If, however, one of the circuit breakers 5 and 7 is automatically opened to clear a fault on its associated line and the other circuit breaker is not automatically opened by its associated fault responsive means 12 until after the relay 26 has completed its timing operation and has opened its contacts 27, the opening of this other circuit breaker does not effect the automatic reclosure of either of the circuit breakers because the energizing circuits of the two reclosing relays 21 are opened at the contacts 27 of relay 26.

When one of the circuit breakers 5 and 7 has been taken out of service intentionally by the operator moving the associated control switch 15 to its tripping position, the opening of the contacts 19 of the operated control switch 15 prevents the associated control relay 21 from being energized to reclose the opened circuit breaker until the control switch 15 is again moved to its closing position. The closing of the contacts 20 of the operated control switch 15, however, completes a shunt circuit around the contacts 27 of the relay 26 so that the reclosing relay 21 associated with the other circuit breaker is rendered operative to effect the immediate reclosing thereof when it opens, thus providing immediate reclosing at a time when it is desirable to restore service between the buses 3 and 4 as quickly as possible in order to maintain synchronism.

If a circuit breaker is out of service for inspection or repairs and automatic reclosing is desired on the other circuit breaker, regardless of the position of the circuit breaker which has been taken out of service or the position of the control switch 15 associated with the circuit breaker that has been taken out of service, the cut-in switch 25 associated with the circuit breaker which has been taken out of service is closed so as to complete a shunt circuit around the contacts 23 of the circuit breaker which has been taken out of service and the contacts 27 of the relay 26 which are in the energizing circuit of the reclosing relay 21 associated with the circuit breaker which is still in service. Therefore, in case a fault occurs on the line remaining in service, the circuit breaker in that line is immediately reclosed.

While we have, in accordance with the patent statutes, shown and described our invention as applied to a particular system and as embodying various devices diagrammatically indicated, changes and modifications will be obvious to those skilled in the art, and we therefore aim in the appended claims to cover such changes and modifications as fall within the true spirit and scope of our invention.

What we claim as new and desire to secure by Letters Patent of the United States is:

1. In combination, a plurality of parallel lines, a circuit breaker in each of said lines, means for opening the circuit breaker in one of said lines, automatic reclosing means for the circut breaker in another of said lines normally unresponsive to the opening of its associated circuit breaker, means responsive to the opening of said circuit breaker in said one of said lines for rendering said reclosing means responsive to the opening of its associated circuit breaker, and means for opening the circuit breaker associated with said reclosing means.

2. In combination, a plurality of parallel lines, a circuit breaker in each of said lines, means for opening each circuit breaker, automatic reclosing means for each circuit breaker normally unresponsive to the opening of any circuit breaker, and means responsive to the opening of a circuit breaker for rendering the reclosing means associated with another circuit breaker responsive to the opening thereof.

3. In combination, a plurality of parallel lines, a circuit breaker in each of said lines, fault responsive means for opening each circuit breaker, and means controlled by the positions of said circuit breakers for reclosing a circuit breaker in response to the opening thereof only when the circuit breaker in another of said parallel circuits is also open.

4. In combination, two parallel lines, a circuit breaker in each line, means for opening each circuit breaker in response to a fault on the associated line, and means controlled by the positions of said circuit breakers for automatically reclosing a circuit breaker in response to the opening of both circuit breakers only.

5. In combination, two parallel lines, a circuit breaker in each line, means for opening each circuit breaker in response to a fault on the associated line, and means controlled by the positions of said circuit breakers for automatically reclosing a circuit breaker only when both of said circuit breakers are opened within a predetermined time interval.

6. In combination, two parallel lines, a circuit breaker in each line, means for opening each circuit breaker in response to a fault on the associated line, manually controlled means for effecting the opening of each circuit breaker, automatic reclosing means for each circuit breaker normally unresponsive to the opening thereof, means responsive to the opening of a circuit breaker by its associated fault responsive means for rendering the automatic reclosing means associated with the other circuit breaker responsive to the opening thereof, and means controlled by each manually controlled means for rendering the automatic reclosing means associated with the other circuit breaker responsive to the opening thereof.

7. In combination, two parallel lines, a circuit breaker in each line, means for opening each circuit breaker in response to a fault on the associated line, means responsive to the opening of both circuit breakers for effecting the automatic reclosing of one of said circuit breakers, and timing means responsive to the opening of either circuit breaker for rendering said reclosing means inoperative.

8. In combination, two parallel lines, a circuit breaker in each line, means for opening each circuit breaker in response to a fault on the associated line, means responsive to the opening of both circuit breakers for effecting the automatic reclosing of both of said circuit breakers, and timing means responsive to the opening of either circuit breaker for rendering said reclosing means inoperative.

9. In combination, two parallel lines, a circuit breaker in each line, means for opening each circuit breaker in response to a fault on the associated line, means responsive to the opening of both circuit breakers for effecting the automatic reclosing of one of said circuit breakers, timing means responsive to the opening of either circuit breaker for rendering said reclosing means inoperative, manually controlled means associated with each circuit breaker for effecting the opening thereof, and means controlled by each manually controlled means for removing said reclosing means from the control of said timing means.

10. In combination, two parallel lines, a circuit breaker in each line, means for opening each circuit breaker in response to a fault on the associated line, means responsive to the opening of both circuit breakers for effecting the automatic reclosing of both of said circuit breakers, timing means responsive to the opening of either circuit breaker for rendering said reclosing means inoperative, manually controlled means associated with each circuit breaker for effecting the opening thereof, and means controlled by each manually controlled means for removing said reclosing means from the control of said timing means.

FRANCIS A. HAMILTON, Jr.
ELBERT H. BANCKER.